United States Patent
Campos et al.

(10) Patent No.: US 12,067,039 B1
(45) Date of Patent: Aug. 20, 2024

(54) SYSTEMS AND METHODS FOR PROVIDING USER INTERFACES FOR CONFIGURATION OF A FLOW FOR EXTRACTING INFORMATION FROM DOCUMENTS VIA A LARGE LANGUAGE MODEL

(71) Applicant: Instabase, Inc., Dover, DE (US)

(72) Inventors: Jessica Andersen Campos, Bend, OR (US); Eric Han, Austin, TX (US); Hariharan Thirugnanam, Bangalore (IN); Subash Chandran Thirumaran, Tirupur (IN); Timothy Serkes, New York, NY (US); Alagu Chockalingam, San Francisco, CA (US); Varun Jain, Bengaluru (IN)

(73) Assignee: Instabase, Inc., Dover, DE (US)

( * ) Notice: Subject to any disclaimer, the term of this patent is extended or adjusted under 35 U.S.C. 154(b) by 0 days.

(21) Appl. No.: 18/327,636

(22) Filed: Jun. 1, 2023

(51) Int. Cl.
*G06F 16/00* (2019.01)
*G06F 16/332* (2019.01)
*G06F 16/35* (2019.01)
*G06V 30/412* (2022.01)

(52) U.S. Cl.
CPC ........ *G06F 16/3328* (2019.01); *G06F 16/358* (2019.01); *G06V 30/412* (2022.01)

(58) Field of Classification Search
CPC .. G06F 16/168; G06F 16/254; G06F 16/3328; G06F 16/358; G06V 30/412
See application file for complete search history.

(56) References Cited

U.S. PATENT DOCUMENTS

| | | |
|---|---|---|
| 5,848,184 A | 12/1998 | Taylor |
| 5,898,795 A | 4/1999 | Bessho |
| 7,689,431 B1 | 3/2010 | Carmel |
| 7,720,318 B1 | 5/2010 | Phinney |
| 7,725,423 B1 | 5/2010 | Pricer |
| 8,254,681 B1 | 8/2012 | Poncin |
| 9,275,030 B1 | 3/2016 | Fang |
| 9,607,058 B1 | 3/2017 | Gupta |
| 10,679,089 B2 | 6/2020 | Annis |

(Continued)

OTHER PUBLICATIONS

Chaudhuri et al., "Extraction of type style-based meta-information from imaged documents", IJDAR (2001) 3: 138-149. (Year: 2001).

(Continued)

*Primary Examiner* — Diedra McQuitery
(74) *Attorney, Agent, or Firm* — Esplin & Associates, PC (57) ABSTRACT

Systems and methods for providing user interfaces for configuration of a flow for extracting information from documents via a large language model are disclosed. Exemplary implementations may: present a user interface configured to obtain entry of user input from a user to select a set of exemplary documents; select one or more document classifications for the set of exemplary documents; select one or more extraction fields that correspond to individual queries; navigate between different portions of the user interface; present the set of document classifications; present a particular individual document in the user interface; present a set of extraction fields in the user interface, wherein the individual extraction fields present individual replies obtained from the large language model in reply to the individual queries; and/or perform other steps.

20 Claims, 6 Drawing Sheets

(56) References Cited

U.S. PATENT DOCUMENTS

| | | | |
|---|---|---|---|
| 11,315,353 | B1 | 4/2022 | Cahn |
| 11,494,551 | B1* | 11/2022 | Espinas ................ G06N 20/00 |
| 2002/0064316 | A1 | 5/2002 | Takaoka |
| 2004/0181749 | A1 | 9/2004 | Chellapilla |
| 2004/0223648 | A1 | 11/2004 | Hoene |
| 2005/0289182 | A1 | 12/2005 | Pandian |
| 2008/0148144 | A1 | 6/2008 | Tatsumi |
| 2008/0212901 | A1 | 9/2008 | Castiglia |
| 2008/0291486 | A1 | 11/2008 | Isles |
| 2009/0076935 | A1 | 3/2009 | Knowles |
| 2009/0132590 | A1 | 5/2009 | Huang |
| 2012/0072859 | A1 | 3/2012 | Wang |
| 2012/0204103 | A1 | 8/2012 | Stevens |
| 2014/0200880 | A1 | 7/2014 | Neustel |
| 2014/0214732 | A1 | 7/2014 | Carmeli |
| 2015/0012422 | A1 | 1/2015 | Ceribelli |
| 2015/0169951 | A1 | 6/2015 | Khintsitskiy |
| 2015/0169995 | A1 | 6/2015 | Panferov |
| 2015/0278197 | A1 | 10/2015 | Bogdanova |
| 2016/0014299 | A1 | 1/2016 | Saka |
| 2016/0275526 | A1 | 9/2016 | Becanovic |
| 2018/0189592 | A1 | 7/2018 | Annis |
| 2018/0329890 | A1 | 11/2018 | Ito |
| 2018/0349388 | A1* | 12/2018 | Skiles ................ G06F 16/358 |
| 2019/0286900 | A1 | 9/2019 | Pepe, Jr. |
| 2020/0089946 | A1 | 3/2020 | Mallick |
| 2020/0104359 | A1 | 4/2020 | Patel |
| 2020/0302166 | A1* | 9/2020 | Meier ................ G06F 18/40 |
| 2020/0364343 | A1 | 11/2020 | Atighetchi |
| 2021/0258448 | A1 | 8/2021 | Yuusuke |
| 2022/0398858 | A1 | 12/2022 | Cahn |
| 2023/0334889 | A1 | 10/2023 | Cahn |
| 2024/0007694 | A1* | 1/2024 | Riley ................ G06F 3/0486 |

OTHER PUBLICATIONS

Doermann et al., "Image Based Typographic Analysis of Documents", Proceedings of 2nd International Conference on Document Analysis and Recognition, pp. 769-773, 1993 IEEE. (Year: 1993).

Shafait ("Document image analysis with OCRopus," IEEE 13th International Mulititopic Conference; Date of Conference: Dec. 14-15, 2009) (Year: 2009) 6 pages.

Singh et al. (A Proposed Approach for Character Recognition Using Document Analysis with OCR, Second InternationalConference on Intelligent Computing and Control Systems: Date of Conference: Jun. 14-15, 2018) (Year: 2018) 6 pages.

Slavin et al., "Matching Digital Copies of Documents Based on OCR", 2019 XXI International Conference Complex Systems: Control and Modeling Problems (CSCMP), pp. 177-181 , published on Sep. 1, 2019. (Year: 2019).

* cited by examiner

BIG BANK
P O Box 1
Somecity, XY

John Johnson
123 Main Street
Anytown, USA

Date: 02/01/XX through 02/08/XX
Account Number: 000 00 300 02 001

CUSTOMER SERVICE INFORMATION
Website            bigbank.com
Service center         1-800-123-4567
International calls    1-123-456-7890

_37_  _36_

CHECKING SUMMARY                          AMOUNT
Beginning Balance                   $1000.00
Deposits and Additions                    100.00
Checks Paid                               -50.00
ATM & Debit Card Withdrawals             -200.00
Electronic Withdrawals                         0
Fees                                      -10.00
Ending Balance                       $840.00

CHECKS PAID

CHECK NUMBER    DATE PAID    AMOUNT
1234            02/03        $50.00

TRANSACTION DETAIL

DATE  DESCRIPTION           AMOUNT
02/04 ATM withdrawal        $200.00

_Fig. 3B_

SYSTEMS AND METHODS FOR PROVIDING USER INTERFACES FOR CONFIGURATION OF A FLOW FOR EXTRACTING INFORMATION FROM DOCUMENTS VIA A LARGE LANGUAGE MODEL

FIELD OF THE DISCLOSURE

The present disclosure relates to systems and methods for providing user interfaces for configuration and/or design of a flow for extracting information from documents via a large language model.

BACKGROUND

Extracting information from electronic documents is known. Presenting information in user interfaces is known. Large language models are known.

SUMMARY

One aspect of the present disclosure relates to a system configured for providing user interfaces for configuration of a flow for extracting information from documents via a large language model. The system may include one or more hardware processors configured by machine-readable instructions. The system may be configured to present a user interface configured to obtain entry of user input from a user to select a set of exemplary documents. The system may be configured to select one or more document classifications for the set of exemplary documents. The system may be configured to select one or more extraction fields that correspond to individual queries; navigate between different portions of the user interface. The system may be configured to present the set of document classifications. The system may be configured to present a particular individual document in the user interface. The system may be configured to present a set of extraction fields in the user interface, wherein the individual extraction fields present individual replies obtained from the large language model in reply to the individual queries. The system may be configured to perform other steps.

Another aspect of the present disclosure relates to a method for providing user interfaces for configuration of a flow for extracting information from documents via a large language model. The method may include presenting a user interface configured to obtain entry of user input from a user to select a set of exemplary documents. The method may include selecting one or more document classifications for the set of exemplary documents. The method may include selecting one or more extraction fields that correspond to individual queries. The method may include navigating between different portions of the user interface. The method may include presenting the set of document classifications. The method may include presenting a particular individual document in the user interface. The method may include presenting a set of extraction fields in the user interface, wherein the individual extraction fields present individual replies obtained from the large language model in reply to the individual queries. The method may include performing other steps.

As used herein, any association (or relation, or reflection, or indication, or correspondency) involving servers, processors, client computing platforms, documents, formats, blocks of content, characters, conversations, presentations, extracted information, classifications, user interfaces, user interface elements, fields, portions, queries, replies, prompts, models, representations, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, extract, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
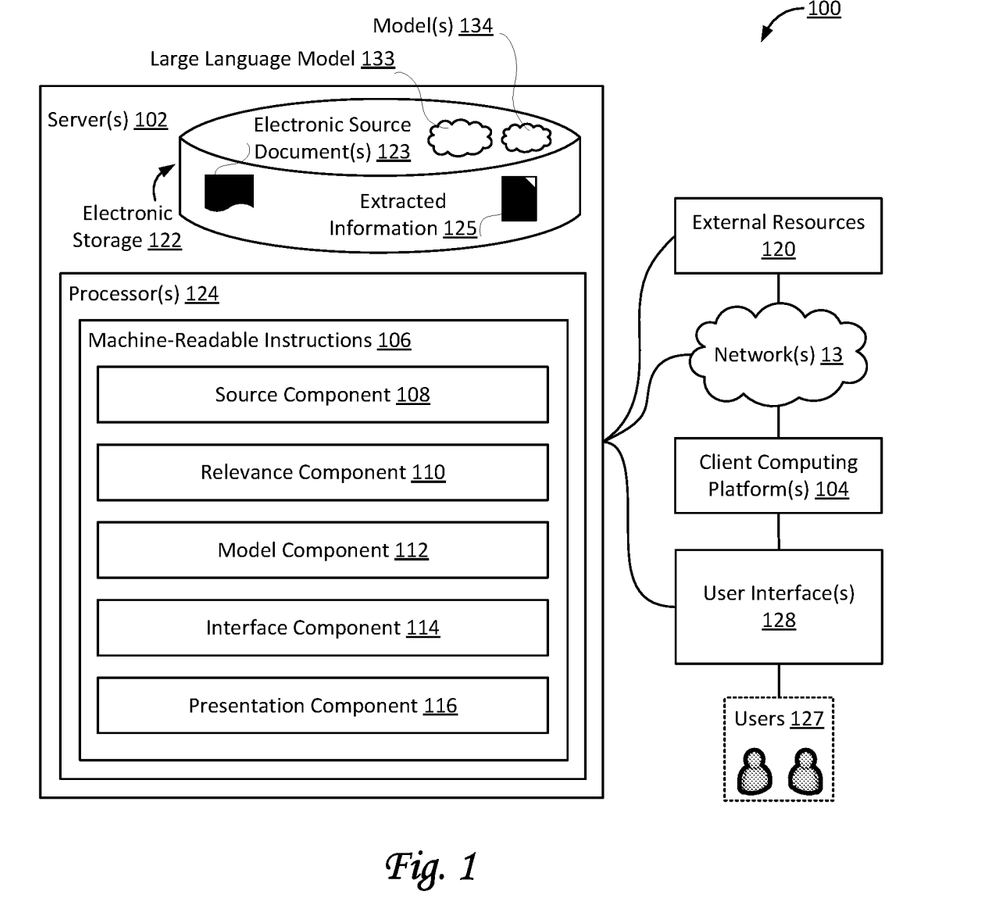
FIG. 1 illustrates a system configured for providing user interfaces for configuration and/or design of a flow for extracting information from documents via a large language model, in accordance with one or more implementations.

FIG. 1 illustrates a system 100 configured for providing user interfaces for configuration and/or design of a flow for extracting information from documents via a large language model (LLM) 133, in accordance with one or more implementations. In some implementations, system 100 may include one or more servers 102, one or more client computing platforms 104, one or more user interfaces 128, external resources 120, large language model 133, one or more other models 134, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 127 may access system 100 via client computing platform(s) 104. In some implementations, individual users may be associated with individual client computing platforms 104. For example, a first user may be associated with a first client computing platform 104, a second user may be associated with a second client computing platform 104, and so forth. In some implementations, individual user interfaces 128 may be associated with individual client computing platforms 104. For example, a first user interface 128 may be associated with a first client computing platform 104, a second user interface 128 may be associated with a second client computing platform 104, and so forth. By virtue of the systems and methods disclosed herein, a user may configure and/or design a flow for the extraction of information from a corpus of electronic documents. This configuration or design may be based on a set of exemplary documents (also referred to as the "training set" or "training data"). In this flow, individual documents are classified (e.g., by way of non-limiting example, as "passport", "paystub", "W2 form", "bank statement", and/or other types or classes of documents). Based on a specific classification, particular information may be extracted from an individual document. The user may modify which particular information is extracted and/or how the particular information is extracted. Once the appropriate and/or correct information can be extracted from the set of exemplary documents, the flow can be applied to other documents, such as a particular corpus of electronic documents. How a particular flow uses extracted information from the particular corpus of electronic documents may be outside of the scope of this disclosure. By way of non-limiting example, such a flow, after configuration, may be used to process a mortgage application, a loan application, an insurance claim, an application for an identity document, and/or other to support other uses of (at least partially) automating the extraction of information from documents.

Server(s) 102 may be configured by machine-readable instructions 106. Machine-readable instructions 106 may include one or more instruction components. The instruction components may include computer program components. The instruction components may include one or more of a source component 108, a relevance component 110, a model component 112, an interface component 114, a presentation component 116, and/or other instruction components.

Source component 108 may be configured to obtain and/or retrieve documents, including but not limited to electronic source documents, including scanned images, captured photographs, and/or other documents in electronic format. As used herein, the terms "electronic document" and "electronic source document", and derivatives thereof, may be used interchangeably. In some implementations, multiple documents may form a set of exemplary documents. For example, the set of exemplary documents may be provided as input to configure and/or design a flow for extracting information, e.g., from a corpus of electronic documents. For example, the set of exemplary documents may be training data for the configuration of the flow for extracting information.

In some implementations, source component 108 may obtain and/or access documents forming a corpus of electronic documents, and/or of a set of exemplary documents. By way of non-limiting example, the electronic formats of the electronic documents may be one or more of Portable Document Format (PDF), Portable Network Graphics (PNG), Tagged Image File Format (TIF or TIFF), Joint Photographic Experts Group (JPG or JPEG), and/or other formats. Electronic documents may be stored and obtained as electronic files. In some implementations, an electronic document may be a scanned and/or photographed version of an original paper document and/or otherwise physical original document, or a copy of an original digital document. In some implementations, original documents may have been published, generated, produced, communicated, and/or made available by a business entity and/or government agency. Business entities may include corporate entities, non-corporate entities, and/or other entities. For example, an original document may have been communicated to customers, clients, and/or other interested parties. By way of non-limiting example, a particular original document may have been communicated by a financial institution to an account holder, by an insurance company to a policy holder or affected party, by a department of motor vehicles to a driver, etc. In some implementations, original documents may include financial reports, financial records, and/or other financial documents.

As used herein, documents may be referred to as "source documents" when the documents are originally published, generated, produced, communicated, and/or made available, or when the documents are copies thereof. Alternatively, and/or simultaneously, documents may be referred to as "source documents" when the documents are a source of human-readable information, or a basis or a container for human-readable information.

In some implementations, one or more electronic formats used for the electronic documents may encode visual information that represents human-readable information. For example, the human-readable information may be positioned on multiple line positions. In some implementations, the visual information may include one or more blocks of content, such as, e.g., a first block of content, a second block of content, and so forth. Blocks of content may represent human-readable information, such as characters, words, dates, amounts, phrases, etc. In a particular case, different blocks of content may be (positioned) on different lines or line positions. For example, the first block of content may be positioned above or below the second block of content. For example, a third block of content may be positioned above or below a fourth block of content. As an example, two characters could be vertically aligned if they are positioned on the same line, so neither is above or below the other. For example, the elements in a row of a table may be vertically aligned, and the elements in a column of a table may be horizontally aligned.

In some implementations, one or more electronic formats used for the electronic documents may be such that, upon presentation of the electronic documents through user interfaces 128, the presentation(s) include human-readable information. By way of non-limiting example, human-readable information may include any combination of numbers, letters, diacritics, symbols, punctuation, and/or other information (jointly referred to herein as "characters"), which may be in any combination of alphabets, syllabaries, and/or logographic systems. In some implementations, characters may be grouped and/or otherwise organized into groups of characters (e.g., any word in this disclosure may be an example of a group of characters, particularly a group of alphanumerical characters). For example, a particular electronic source document 123 may include multiple groups of characters, such as, e.g., a first group of characters, a second group of characters, a third group of characters, a fourth group of characters, and so forth. Groups of characters may be included in blocks of content.

The electronic formats may be suitable and/or intended for human readers, and not, for example, a binary format that is not suitable for human readers. For example, the electronic format referred to as "PDF" is suitable and intended for human readers when presented using a particular application (e.g., an application referred to as a "pdf reader"). In some implementations, particular electronic source document 123 may represent one or more of a bank statement, a financial record, a photocopy of a physical document from a government agency, and/or other documents. For example, a particular electronic source document 123 may include a captured and/or generated image and/or video. For example, a particular electronic source document 123 may be a captured and/or generated image. The electronic documents obtained by source component 108 may have a particular size and/or resolution.

Figure 3A:
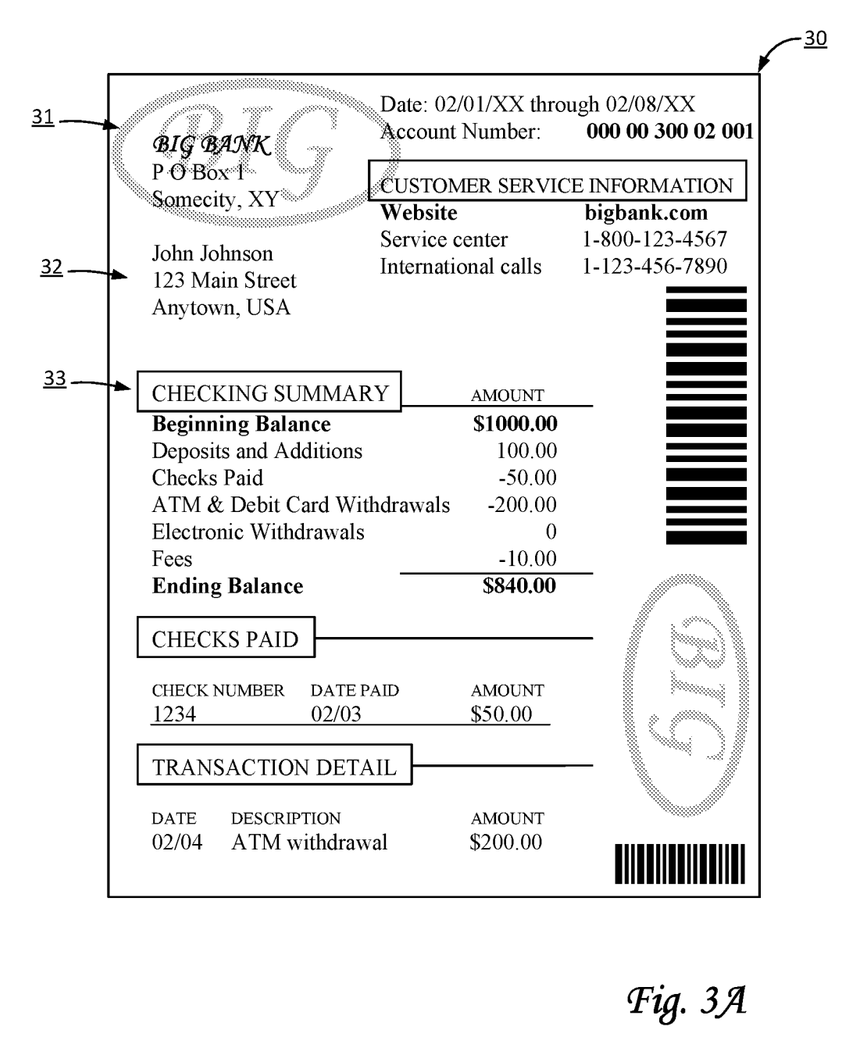
FIG. 3A illustrates an exemplary electronic document as may be used in a system configured for providing user interfaces for configuration and/or design of a flow for extracting information from documents via a large language model, in accordance with one or more implementations.

By way of non-limiting example, FIG. 3A illustrates an exemplary electronic source document 30 as may be used in system 100 (of FIG. 1), in accordance with one or more implementations. Exemplary electronic source document 30 may be part of a corpus of electronic documents, and/or of a set of exemplary documents. Exemplary electronic source document 30 may represent a bank statement from a particular bank, intended for a particular account holder, regarding a particular account of the particular account holder with the particular bank. Exemplary electronic source document 30 includes many content blocks representing human-readable information, including various familiar elements for a bank statement, such as, by way of non-limiting example, the bank's name, address, and logo of the bank as indicated by an indicator 31, an account holder's name and address as indicated by an indicator 32, an overview of checking account information (including, for example, beginning account balance for a particular period and ending account balance for the particular period) as indicated by an indicator 33, and other familiar elements of a bank statement.

Figure 3B:
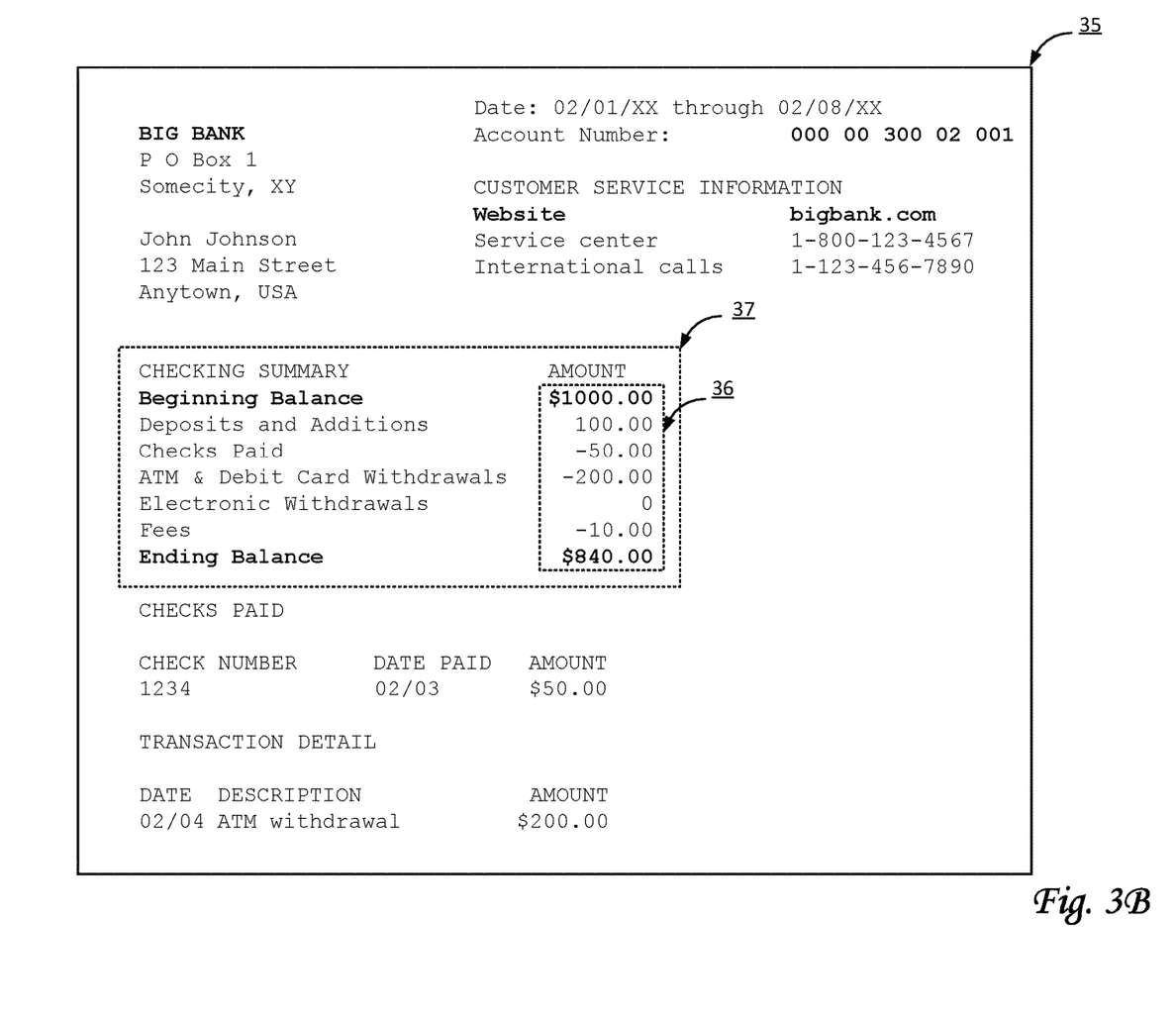
FIG. 3B illustrates an exemplary document as may be used in a system configured for providing user interfaces for configuration and/or design of a flow for extracting information from documents via a large language model, in accordance with one or more implementations.

By way of non-limiting example, FIG. 3B illustrates an exemplary document 35 as may be used in system 100 (of FIG. 1), in accordance with one or more implementations. Exemplary document 35 may be part of a corpus of electronic documents, and/or of a set of exemplary documents. In some implementations, exemplary document 35 may have been created from exemplary electronic source document 30 in FIG. 3A, by converting that document to a text-based document format. The sets of characters in exemplary document 35 may correspond to content blocks in exemplary electronic source document 30 in FIG. 3A. For example, a column 36 of right-aligned sets of characters (in this case, numerical information such as amounts of currency) may correspond to certain content blocks in exemplary electronic source document 30 in FIG. 3A. As depicted in FIG. 3B, column 36 is part of a table 37. For example, the set of characters "Beginning Balance" form a row label, the set of characters "AMOUNT" form a column label, and the set of characters "$1000.00" form the attribute value for this row. Likewise, in table 37, "$840.00" is the attribute value (or amount) for "Ending Balance".

Referring to FIG. 1, presentation component 116 may be configured to generate, effectuate, and/or present user interfaces 128 on client computing platforms 104 to users 127. For example, presentation component 116 may be configured to present a particular user interface 128 on a particular client computing platform 104 to a particular user. In some implementations, particular user interface 128 may be configured to obtain entry of user input from a particular user. For example, the user input may select one or more documents, including but not limited to a set of exemplary document. In some cases, the user input may indicate a folder of training data. In some implementations, the one or more documents may be provided as input to configure and/or design a particular flow for extracting information, e.g., from a particular corpus of electronic documents. Alternatively, and/or simultaneously, the user input may select and/or modify one or more document classifications, e.g., from a set of document classifications for a particular set of exemplary documents. Alternatively, and/or simultaneously, the user input may select and/or modify one or more extraction fields, e.g., from an individual document classification. In some implementations, the user input may navigate between a set of different portions or sections of particular user interface 128. For example, particular user interface 128 may include one or more portions or sections. In some implementations, a portion or section may be a (sub)window, a tab, a frame, and/or another part of particular user interface 128. In some implementations, particular user interface 128 may include at least four portions. In other implementations, particular user interface 128 may include at least three portions. In yet other implementations, particular user interface 128 may include at least two portions. In yet other implementations, particular user interface 128 may include at least one portion.

In some implementations, one or more particular documents may be provided as input to large language model 133 for a particular conversation between the particular user and the one or more particular documents. As used herein, a "conversation" may include one or more sets of queries (or questions) and replies (or responses) between a user and large language model 133 regarding one or more documents. In some implementations, the user input may enter queries, from the particular user, regarding some or all of the one or more documents, e.g., as previously selected.

Figure 4:
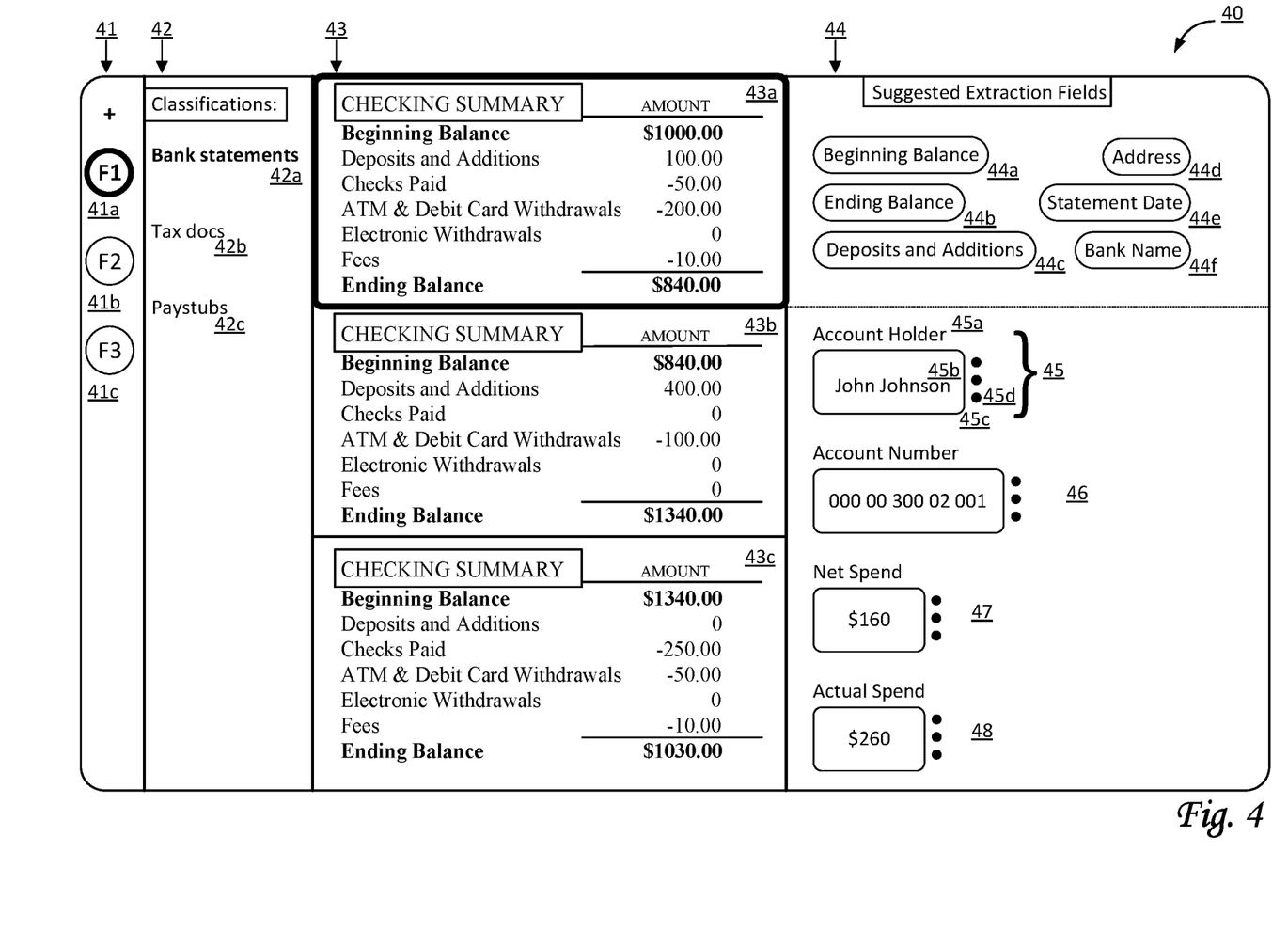
FIG. 4 illustrates an exemplary user interface as may be used in a system configured for providing user interfaces for configuration and/or design of a flow for extracting information from documents via a large language model, in accordance with one or more implementations.

By way of non-limiting example, FIG. 4 illustrates an exemplary user interface 40 as may be used by system 100. As depicted, exemplary user interface 40 includes a first portion 41, a second portion 42, a third portion 43, and a fourth portion 44, each of which extends from the top of exemplary user interface 40 to the bottom of exemplary user interface 40. By way of non-limiting example, some or all of these portions are presented to the user at the same time. In some implementations, first portion 41 may be configured to select an individual flow from a set of flows being configured and/or designed by a user for information extraction (flows may also be referred to as "projects" or "sessions" in some cases). For example, as depicted, a flow 41a, labeled "F1", is currently selected. Additional flows include a flow 41b (labeled "F2") and a flow 41c (labeled "F3").

Additionally, second portion 42 of exemplary user interface 40 may be configured to select and/or modify, by a particular user, individual document classifications from a particular set of document classifications. Second portion 42 may be specific to the particular flow as selected in first portion 41. In some implementations, second portion 42 may include a notification 42*a* regarding a particular document classification. For example, as depicted here, a particular set of exemplary documents has been classified as either "Bank statements" (indicated by notification 42*a*), "Tax docs" (indicated by a notification 42*b*), or "Paystubs" (indicated by a notification 42*c*). In some implementations, the particular user may modify one or more document classifications in second portion 42, e.g., to delete a particular document classification, to merge one or more document classifications, and/or to otherwise make modifications. For example, different classifications for "US passport" and "Canadian passport" could be merged into (generic) "passport". For example, different classifications for "W2 tax form", "W4 tax form", and "1099 form" could be merged into "Tax docs". In some implementations, an individual document classification may include or be based on document classifications determined by a trained machine-learning model 134*a* (part of models 134 in FIG. 1) for document classification. In some implementations, an individual document classification may be based on heuristic determinations. In some implementations, an individual document classification may be based on (expert) user input.

Additionally, in this example depicted in FIG. 4, third portion 43 of exemplary user interface 40 may be configured to select and/or modify, by a particular user, a particular document classification for a particular individual document 43*a* (current selected as indicated by a thick outline and shown in part in FIG. 4). Additional documents 43*b* and 43*c* are shown in part, but not currently selected. For example, assume particular individual document 43*a* has been classified into particular document classification 42*a*. Assume documents 43*b* and 43*c* have also been classified into particular document classification 42*a*. Assume documents 43*b* and 43*c* are similar electronic source documents (here, bank statements) for different weeks or months, but for the same account holder and account. Particular individual document 43*a* may be the same as or similar to exemplary electronic source document 30 from FIG. 3A (which is a bank statement regarding a particular account of a particular account holder, though only the "CHECKING SUMMARY" table is presented in FIG. 4). In some implementations, the particular user may modify one or more document classifications in third portion 43, e.g., to change a particular document classification from "Paystubs" to "Bank statements".

In some implementations, third portion 43 of the user interface may be configured to present multiple documents in the same document classification, the multiple documents being arranged vertically, above and below each other. Alternatively, in some implementations, third portion 43 of the user interface may be configured to present at least one document for individual ones of the set of document classifications presented in second portion 42. For example (not as depicted in FIG. 4), the top document(s) may be classified under document classification 42*a*, the middle document(s) may be classified under document classification 42*b*, and the bottom document(s) may be classified under document classification 42*c*.

Additionally, in this example depicted in FIG. 4, fourth portion 44 of exemplary user interface 40 may be configured to select and/or modify, by a particular user, extraction fields for a particular document and/or document classification, such as document 43*a* and/or document classification 42*a* as selected. The extraction fields are shown in the bottom part of fourth portion 44 of exemplary user interface 40. In some implementations, an individual document classification (say, "Paystub") may be associated with one or more extraction fields (say, "Employee name", "net pay", etc.). In some implementations, an individual extraction field may correspond to an individual query that is provided as a prompt to large language model 133. In some implementations, large language model 133 may use particular individual document 43*a* as context for the individual query. For example, fourth portion 44 depicts extraction fields 45-46-47-48. A presentation of extraction field 45 may include (1) an individual reply 45*b* (here, "John Johnson") presented in graphical user interface element 45*c* (e.g., a field), with the individual reply being provided by large language model 133 in reply to an individual query that has been provided as a prompt to large language model 133, (2) a representation 45*a* of the individual query (here, "Account Holder" is a representation of a query or prompt "What is the full name of the account holder?", and (3) a graphic user interface element 45*d* that allows the particular user to modify the individual query (here, depicted as three dots that provide access to modify the individual query, for example through a pulldown menu). Likewise, extraction field 46 may present a reply (here, "000 00 300 02 001") to the prompt "What is the account number associated with the current bank statement?", extraction field 47 may present a reply (here, "$160") to the prompt "What is the difference between the beginning balance and the ending balance of the current bank statement?", and extraction field 48 may present a reply (here, "$260") to the prompt "What is the absolute sum of negative attributes in the amount column of the checking summary table of the current bank statement?". As shown, representations of queries may be shorter than the queries themselves.

In some implementations, fourth portion 44 of exemplary user interface 40 may be configured to present additional extraction fields that are available to be added to the set of extraction fields. For example, as depicted in the top part of fourth portion 44 in FIG. 4, additional extraction fields are presented under the heading "Suggested Extraction Fields", and include "Beginning Balance" 44*a*, "Ending Balance" 44*b*, "Deposits and Additions" 44*c*, "Address" 44*d*, "Statement Date" 44*e*, and "Bank Name" 44*f*.

Figure 5:
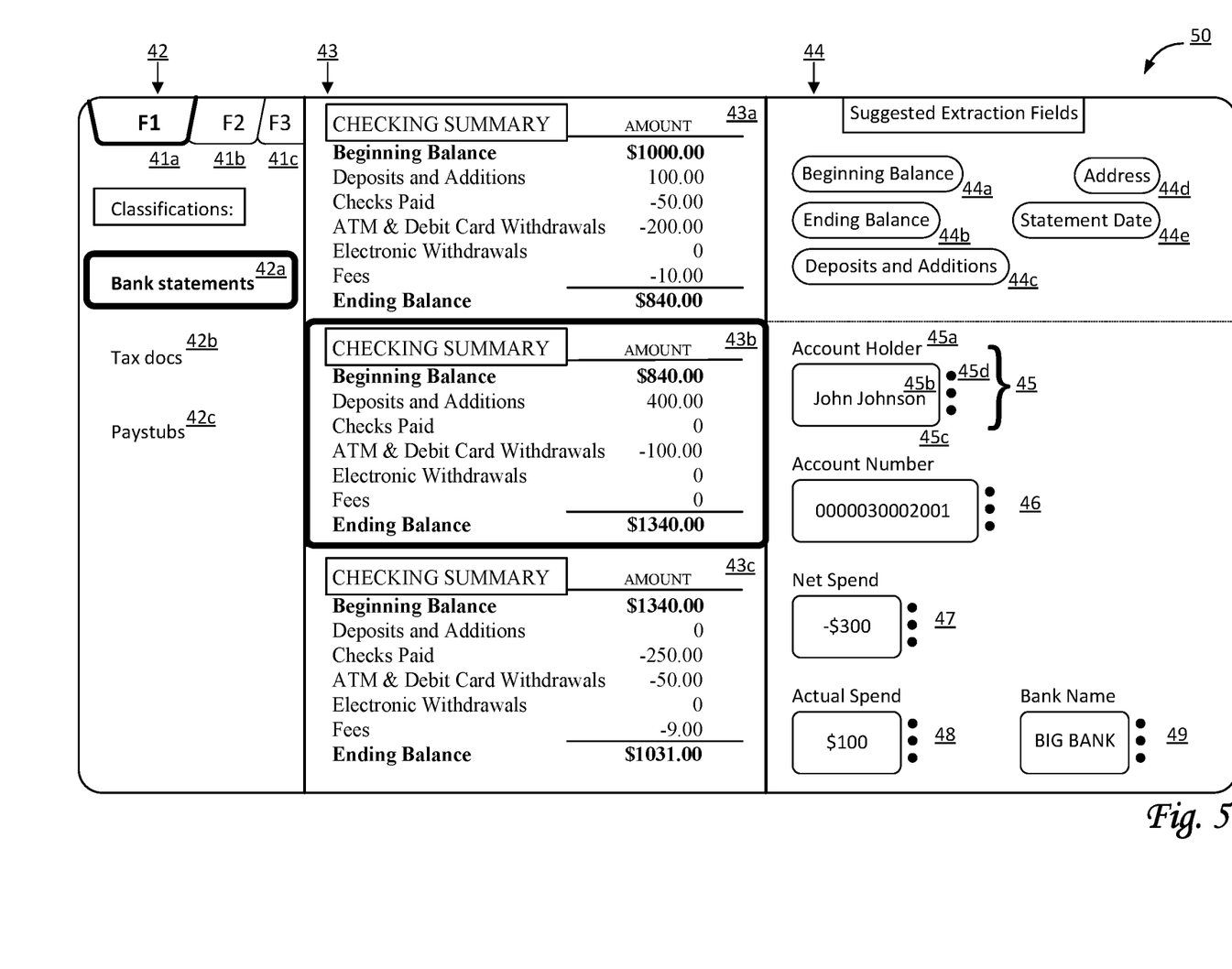
FIG. 5 illustrates an exemplary user interface as may be used in a system configured for providing user interfaces for configuration and/or design of a flow for extracting information from documents via a large language model, in accordance with one or more implementations.

By way of non-limiting example, FIG. 5 illustrates an exemplary user interface 50 as may be used by system 100. As depicted, exemplary user interface 50 includes elements of first portion 41 from FIG. 4 (allowing a selection between flow 41*a*, flow 41*b*, and flow 41*c*, through tabs), a second portion 42, a third portion 43, and a fourth portion 44, similar to FIG. 4. In third portion 43 of exemplary user interface 50, individual document 43*b* has been selected, as indicated by a thick outline. In fourth portion 44, extraction field 47 and extraction 48 have been updated to correspond to individual document 43*b* (here, "−$300" and "$100", respectively). Additionally, the previously suggested extraction field for "Bank Name" 44*f* has been added as an extraction field 49, shown near the bottom of exemplary user interface 50. Additionally, the user may have modified the prompt for extraction field 46 to "What is the account number associated with the current bank statement, formatted without blank spaces?", thus causing the updated reply from large language model 133 in extraction field 46.

Referring to FIG. 1, in some implementations, presentation component 116 may be configured to present one or more graphical user interface elements on one or more user interfaces 128, e.g., responsive to a selection by a user (e.g., through user input received by interface component 114). In some implementations, presentation component 116 may present particular information in a particular portion of particular user interface 128. Referring to FIG. 4, for example, presentation component 116 may present replies to queries in fourth portion 44. User interfaces 128 may be configured to enable users 127 to control (e.g., through user input) the extraction of information from one or more documents. Extraction of information may be performed by large language model 133 (e.g., using a particular document as input and/or context). In some implementations, the extraction of information may be user-directed, i.e., controlled by an individual one of users 127 through user input into, e.g., fourth portion 44 of particular user interface 128.

Referring to FIG. 1, model component 112 may be configured to obtain, access, use, and/or fine-tune a large language model (LLM) 133. In some implementations, large language model 133 may have been trained on at least a million documents. In some implementations, large language model 133 may have been trained on at least 100 million documents. In some implementations, large language model 133 may include and/or be based on a neural network using over a billion parameters and/or weights. In some implementations, large language model 133 may include and/or be based on a neural network using over a 100 billion parameters and/or weights. In some implementations, large language model 133 may be based on Generative Pre-trained Transformer 3 (GPT3). In some implementations, large language model 133 may be based on ChatGPT, as developed by OpenAI™. In some implementations, large language model 133 may be derived from Generative Pre-trained Transformer 3 (GPT3) or a successor of Generative Pre-trained Transformer 3 (GPT3). In some implementations, model component 112 may be configured to fine-tune large language model 133 through a set of documents (e.g., training documents). In some cases, the training documents may include financial documents, including but not limited to bank statements, insurance documents, mortgage documents, loan documents, and/or other financial documents. Large language model 133 may be able to determine and/or use whether information is formatted in a column, or a row, or a table. Accordingly, information elements in a column, or a row, or a table may be contextually and/or semantically linked and/or otherwise connected such that large language model 133 may extract information from a particular document based on knowledge of the formatted information in the particular document. In some implementations, model component 112 may be configured to obtain and/or present replies provided by large language model 133 to queries and/or prompts.

Referring to FIG. 1, interface component 114 may be configured to provide documents to large language model 133 as input and/or context. For example, interface component 114 may provide one or more particular documents to large language model 133 as input and/or context for queries and/or other types of extraction of information. In some implementations, interface component 114 provides input documents to large language model 133 for extraction of information, including but not limited to user-directed extraction of information. In some implementations, interface component 114 may be configured to provide queries as prompts to large language model 133. In some implementations, interface component 114 may be configured to obtain replies to queries from large language model 133. For example, a user may enter a query to cause large language model 133 to extract the net amount spent in a particular week from exemplary electronic source document 30 in FIG. 3A or particular document 43a in FIG. 4 (e.g., based on the difference between beginning and ending balance, here "$160"). For example, a user may enter a query to cause large language model 133 to extract the actual amount spent in a particular week from exemplary electronic source document 30 in FIG. 3A or particular document 43b in FIG. 5 (e.g., based on the difference between beginning and ending balance, and any deposits or additions—or alternatively on the absolute sum of negative attributes in the amount column—such that in FIG. 4, the actual amount spent would be $260 (based on $50+$200+$10), and in FIG. 5, the actual spend would be $100). In some implementations, interface component 114 may provide input and/or prompts to large language model 133 after or subsequent to fine-tuning of large language model 133 by model component 112.

Referring to FIG. 1, relevance component 110 may be configured to determine one or more documents from a corpus of electronic documents, the one or more documents being relevant to a particular query and/or a particular corresponding reply. In some implementations, relevance component 110 may be configured to make one or more determinations regarding a corpus of electronic documents. For example, if a particular reply is based on information from a particular document, relevance component 110 may notify a user thereof. In some implementations, relevance component 110 may be configured to make one or more determinations regarding an individual document in a corpus of electronic documents. For example, if a particular reply is based on information from one or more sections of a document, relevance component 110 may notify a user thereof. In some implementations, relevance component 110 may be configured to provide provenance for the contents of replies to queries. In some implementations, determinations by relevance component 110 may be based on output and/or meta-information from large language model 133.

As used herein, the term "extract" and its variants refer to the process of identifying and/or interpreting information that is included in one or more documents, whether performed by determining, measuring, calculating, computing, estimating, approximating, interpreting, generating, and/or otherwise deriving the information, and/or any combination thereof. In some implementations, extracted information may have a semantic meaning, including but not limited to opinions, judgement, classification, and/or other meaning that may be attributed to (human and/or machine-powered) interpretation. For example, in some implementations, some types of extracted information need not literally be included in a particular electronic source document, but may be a conclusion, classification, and/or other type of result of (human and/or machine-powered) interpretation of the contents of the particular electronic source document. In some implementations, the extracted information may have been extracted by one or more extraction engines. For example, a particular extraction engine (referred to as an OCR engine) may use a document analysis process that includes optical character recognition (OCR). For example, a different extraction engine (referred to as a line engine) may use a different document analysis process that includes line detection. For example, another extraction engine (referred to as a barcode engine) may use a document analysis process that includes detection of barcodes, Quick Response (QR) codes, matrices, and/or other machine-readable optical labels. Alternatively, and/or simultaneously, in some implementations, the extracted information may have been extracted by a document analysis process that uses machine-learning (in particular deep learning) techniques. For example, (deep learning-based) computer vision technology may have been used. For example, a convolutional neural network may have been trained and used to classify (pixelated) image data as characters, photographs, diagrams, media content, and/or other types of information. In some implementations, the extracted information may have been extracted by a document analysis process that uses a pipeline of steps for object detection, object recognition, and/or object classification. In some implementations, the extracted information may have been extracted by a document analysis process that uses one or more of rule-based systems, regular expressions, deterministic extraction methods, stochastic extraction methods, and/or other techniques. In some implementations, particular document analysis processes that were used to extract the extracted information may fall outside of the scope of this disclosure, and the results of these particular document analysis processes, e.g., the extracted information, may be obtained and/or retrieved by a component of system 100.

In some implementations, server(s) 102, client computing platform(s) 104, and/or external resources 120 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

User interfaces 128 may be configured to facilitate interaction between users 127 and system 100 and/or between users 127 and client computing platforms 104. For example, user interfaces 128 may provide an interface through which users may provide information to and/or receive information from system 100. In some implementations, user interface 128 may include one or more of a display screen, touchscreen, monitor, a keyboard, buttons, switches, knobs, levers, mouse, microphones, sensors to capture voice commands, sensors to capture eye movement and/or body movement, sensors to capture hand and/or finger gestures, and/or other user interface devices configured to receive and/or convey user input. In some implementations, one or more user interfaces 128 may be included in one or more client computing platforms 104. In some implementations, one or more user interfaces 128 may be included in system 100.

External resources 120 may include sources of information outside of system 100, external entities participating with system 100, and/or other resources. In some implementations, external resources 120 may include a provider of documents, including but not limited to electronic source documents 123, from which system 100 and/or its components (e.g., source component 108) may obtain documents. In some implementations, external resources 120 may include a provider of information and/or models, including but not limited to extracted information 125, model(s) 134, and/or other information from which system 100 and/or its components may obtain information and/or input. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. In some implementations, some or all of the functionality attributed herein to server 102 and/or system 100 may be provided by resources included in one or more client computing platform(s) 104.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 114, and/or 116, and/or other components. Processor(s) 124 may be configured to execute components 108, 110, 112, 114, and/or 116, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 124 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 124 may be configured to execute one or more additional components that may perform some or all of the functionality attributed below to one of components 108, 110, 112, 114, and/or 116.

Figure 2:
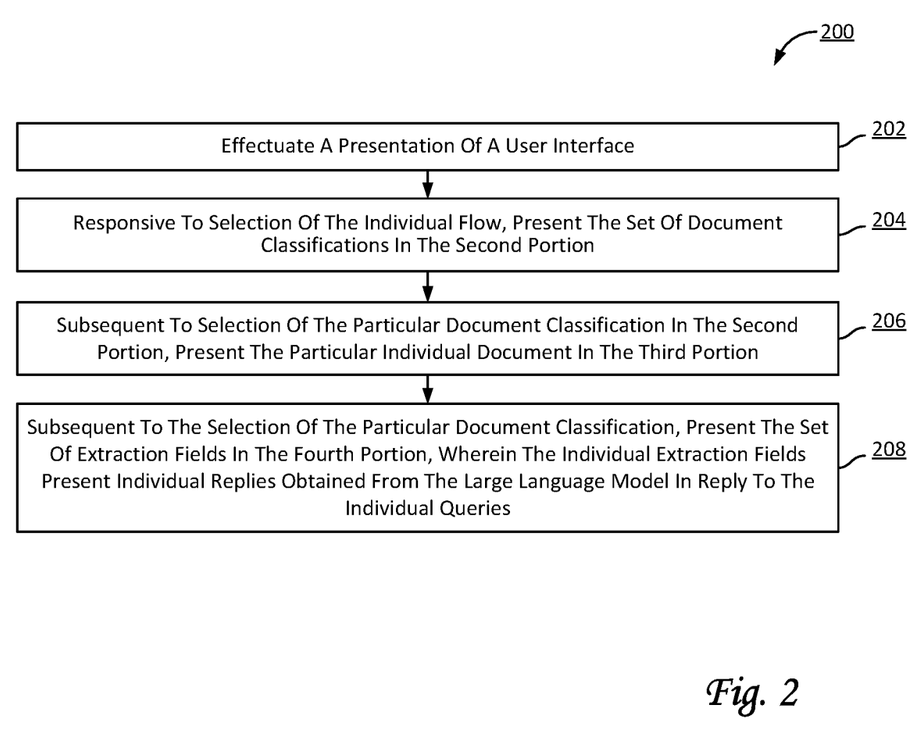
FIG. 2 illustrates a method of providing user interfaces for configuration and/or design of a flow for extracting information from documents via a large language model, in accordance with one or more implementations.

FIG. 2 illustrates a method 200 of providing user interfaces for configuration of a flow for extracting information from documents via a large language model, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202, a presentation of a user interface is effectuated. The user interface obtains entry of user input from a user to (i) select a set of exemplary documents to be provided as input to configure the flow for extracting information from a corpus of electronic documents, (ii) select and/or modify one or more document classifications from a set of document classifications for the set of exemplary documents, (iii) select and/or modify one or more extraction fields from a set of extraction fields for an individual document classification from the set of document classifications, and (iv) navigate between a set of different portions of the user interface. The set of different portions includes (a) a first portion to select, by the user, an individual flow from a set of flows for information extraction, (b) a second portion to select and/or modify, by the user, individual document classifications from the set of document classifications. Individual documents from the set of exemplary documents are classified into individual ones of the set of document classifications, (c) a third portion to select and/or modify, by the user, a particular document classification for a particular individual document, and (d) the fourth portion to select and/or modify the set of extraction fields for the particular document classification. Individual extraction fields correspond to individual queries that are provided as prompts to the large language model, using the particular individual document as context. In some embodiments, operation 202 is performed by a presentation component the same as or similar to presentation component 116 (shown in FIG. 1 and described herein).

At an operation 204, responsive to selection of the individual flow, the set of document classifications is presented in the second portion. In some embodiments, operation 204 is performed by a presentation component the same as or similar to presentation component 116 (shown in FIG. 1 and described herein).

At an operation 206, subsequent to selection of the particular document classification in the second portion, the particular individual document is presented in the third portion. In some embodiments, operation 206 is performed by a presentation component the same as or similar to presentation component 116 (shown in FIG. 1 and described herein).

At an operation 208, subsequent to the selection of the particular document classification in the second portion, the set of extraction fields is presented in the fourth portion. The individual extraction fields present individual replies obtained from the large language model in reply to the individual queries. In some embodiments, operation 208 is performed by a presentation component and/or a model component the same as or similar to presentation component 116 and/or model component 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for providing user interfaces for configuration of a flow for extracting information from documents via a large language model, wherein the large language model has been trained on at least a million documents, wherein the large language model includes a neural network using over a billion parameters and/or weights, the system comprising:
   one or more hardware processors configured by machine-readable instructions to:
   effectuate a presentation of a user interface, the user interface being configured to obtain entry of user input from a user to:
   (i) select a set of exemplary documents to be provided as input to configure the flow for extracting information from a corpus of electronic documents,
   (ii) select and/or modify one or more document classifications from a set of document classifications for the set of exemplary documents,
   (iii) select and/or modify one or more extraction fields from a set of extraction fields for an individual document classification from the set of document classifications, and
   (iv) navigate between a set of different portions of the user interface, wherein the set of different portions includes:
   (a) a first portion configured to select, by the user, an individual flow from a set of flows for information extraction, (b) a second portion configured to select and/or modify, by the user, individual document classifications from the set of document classifications, wherein individual documents from the set of exemplary documents are classified into individual ones of the set of document classifications, (c) a third portion configured to select and/or modify, by the user, a particular document classification for a particular individual document, wherein the particular individual document has been classified into the particular document classification, and (d) the fourth portion configured to select and/or modify the set of extraction fields for the particular document classification, wherein individual extraction fields correspond to individual queries that are provided as prompts to the large language model, using the particular individual document as context;

responsive to selection of the individual flow, present the set of document classifications in the second portion;

subsequent to selection of the particular document classification in the second portion, present the particular individual document in the third portion; and subsequent to the selection of the particular document classification in the second portion, present the set of extraction fields in the fourth portion, wherein the individual extraction fields present individual replies obtained from the large language model in reply to the individual queries.

2. The system of claim 1, wherein the set of document classifications include document classifications determined by a trained machine-learning model for document classification.

3. The system of claim 1, wherein the set of extraction fields include extraction fields determined by a trained machine-learning model for extraction field determination.

4. The system of claim 1, wherein modification of the set of document classifications includes merging multiple document classifications into a single document classification.

5. The system of claim 1, wherein subsequent to selection of the particular document classification in the second portion, the third portion of the user interface is configured to present multiple documents in the particular document classification, wherein the multiple documents are arranged vertically.

6. The system of claim 1, wherein subsequent to selection of the particular document classification in the second portion, the third portion of the user interface is configured to present at least one document for individual ones of the set of document classifications.

7. The system of claim 1, wherein a presentation of an individual extraction field includes (1) an individual reply that has been provided by the large language model in reply to an individual query, wherein the individual query has been provided as a prompt to the large language model, (2) a representation of the individual query, and (3) a graphic user interface element that allows the user to modify the individual query.

8. The system of claim 1, wherein the fourth portion is further configured to present additional extraction fields that are available to be added to the set of extraction fields.

9. The system of claim 1, wherein the large language model is based on or derived from Generative Pre-trained Transformer 3 (GPT3) or a successor of Generative Pre-trained Transformer 3 (GPT3).

10. The system of claim 1, wherein at least some parts of the first portion, the second portion, the third portion, and the fourth portion are presented to the user at the same time.

11. A method of providing user interfaces for configuration of a flow for extracting information from documents via a large language model, wherein the large language model has been trained on at least a million documents, wherein the large language model includes a neural network using over a billion parameters and/or weights, the method comprising:

effectuating a presentation of a user interface, wherein the user interface obtains entry of user input from a user to (i) select a set of exemplary documents to be provided as input to configure the flow for extracting information from a corpus of electronic documents, (ii) select and/or modify one or more document classifications from a set of document classifications for the set of exemplary documents, (iii) select and/or modify one or more extraction fields from a set of extraction fields for an individual document classification from the set of document classifications, and (iv) navigate between a set of different portions of the user interface, wherein the set of different portions includes (a) a first portion to select, by the user, an individual flow from a set of flows for information extraction, (b) a second portion to select and/or modify, by the user, individual document classifications from the set of document classifications, wherein individual documents from the set of exemplary documents are classified into individual ones of the set of document classifications, (c) a third portion to select and/or modify, by the user, a particular document classification for a particular individual document, wherein the particular individual document has been classified into the particular document classification, and (d) the fourth portion to select and/or modify the set of extraction fields for the particular document classification, wherein individual extraction fields correspond to individual queries that are provided as prompts to the large language model, using the particular individual document as context;

responsive to selection of the individual flow, presenting the set of document classifications in the second portion;

subsequent to selection of the particular document classification in the second portion, presenting the particular individual document in the third portion; and subsequent to the selection of the particular document classification in the second portion, presenting the set of extraction fields in the fourth portion, wherein the individual extraction fields present individual replies obtained from the large language model in reply to the individual queries.

12. The method of claim 11, wherein the set of document classifications include document classifications determined by a trained machine-learning model for document classification.

13. The method of claim 11, wherein the set of extraction fields include extraction fields determined by a trained machine-learning model for extraction field determination.

14. The method of claim 11, wherein modification of the set of document classifications includes merging multiple document classifications into a single document classification.

15. The method of claim 11, wherein subsequent to selection of the particular document classification in the second portion, the third portion of the user interface presents multiple documents in the particular document classification, wherein the multiple documents are arranged vertically.

16. The method of claim 11, wherein subsequent to selection of the particular document classification in the second portion, the third portion of the user interface presents at least one document for individual ones of the set of document classifications.

17. The method of claim 11, wherein a presentation of an individual extraction field includes (1) an individual reply that has been provided by the large language model in reply to an individual query, wherein the individual query has been provided as a prompt to the large language model, (2) a representation of the individual query, and (3) a graphic user interface element that allows the user to modify the individual query.

18. The method of claim 11, wherein the fourth portion further presents additional extraction fields that are available to be added to the set of extraction fields.

19. The method of claim 11, wherein the large language model is based on or derived from Generative Pre-trained Transformer 3 (GPT3) or a successor of Generative Pre-trained Transformer 3 (GPT3).

20. The method of claim 11, wherein at least some parts of the first portion, the second portion, the third portion, and the fourth portion are presented to the user at the same time.

\* \* \* \* \*